United States Patent
Minegishi et al.

(10) Patent No.: US 7,290,528 B2
(45) Date of Patent: Nov. 6, 2007

(54) EXHAUST GAS RECIRCULATION DEVICE FOR INTERNAL COMBUSTION ENGINE

(75) Inventors: Teruhiko Minegishi, Hitachinaka (JP); Yasuyuki Nakano, Tokai (JP)

(73) Assignees: Hitachi, Ltd., Tokyo (JP); Hitachi Car Engineering Co., ltd., Hitachinaka-shi (JP)

( * ) Notice: Subject to any disclaimer, the term of this patent is extended or adjusted under 35 U.S.C. 154(b) by 44 days.

(21) Appl. No.: 10/576,445

(22) PCT Filed: Oct. 23, 2003

(86) PCT No.: PCT/JP03/13529
§ 371 (c)(1),
(2), (4) Date: Apr. 20, 2006

(87) PCT Pub. No.: WO2005/040592
PCT Pub. Date: May 6, 2005

(65) Prior Publication Data
US 2007/0119434 A1 May 31, 2007

(51) Int. Cl.
F02M 25/07 (2006.01)
F02B 47/08 (2006.01)
F02B 33/44 (2006.01)
F02D 11/10 (2006.01)

(52) U.S. Cl. ............ 123/399; 123/568.21; 60/605.2

(58) Field of Classification Search ......... 123/361, 123/396, 399, 403, 568.11, 568.16, 568.21, 123/568.23, 568.24, 568.25, 568.26, 568.27, 123/567.28; 701/103, 108, 110; 60/605.2
See application file for complete search history.

(56) References Cited

U.S. PATENT DOCUMENTS

| 4,171,691 A | * | 10/1979 | Nohira et al. .......... 123/568.22 |
| 6,058,906 A | * | 5/2000 | Yoshino ............... 123/568.21 |
| 2002/0108603 A1 | | 8/2002 | Wienand et al. | |

FOREIGN PATENT DOCUMENTS

| DE | 2835155 | 2/1979 |
| EP | 1316702 A2 | 6/2003 |
| GB | 2002548 A | 2/1979 |
| JP | 54-30319 | 3/1979 |
| JP | 07-83086 | 3/1995 |
| JP | 8-277752 | 10/1996 |
| JP | 10-184408 | 7/1998 |
| JP | 2000-8965 | 1/2000 |

(Continued)

Primary Examiner—Willis R. Wolfe, Jr.
(74) Attorney, Agent, or Firm—Crowell & Moring LLP

(57) ABSTRACT

An object of the present invention is to provide an exhaust gas recirculation device with an improved response speed and accuracy of exhaust gas recirculation flow control in an internal combustion engine. A recirculation gas control valve controls a recirculation flow rate in exhaust gas recirculation passages of the internal combustion engine. An air intake control valve controls a flow rate in an intake passage of the internal combustion engine. An intake airflow sensor detects a flow rate in the intake passage. A recirculation flow sensor detects an exhaust gas recirculation flow rate in the exhaust gas recirculation passage. An exhaust gas recirculation controller performs feedback control of the intake air control valve and/or the recirculation gas control valve so that the exhaust gas recirculation ratio obtained based on outputs of the intake airflow sensor and the recirculation flow sensor is a target ratio recirculation ratio.

6 Claims, 8 Drawing Sheets

FOREIGN PATENT DOCUMENTS

| | | |
|---|---|---|
| JP | 2001-152916 | 6/2001 |
| JP | 3303274 | 5/2002 |
| JP | 3329711 | 7/2002 |
| JP | 2003-83034 | 3/2003 |
| JP | 2003-516496 | 5/2003 |
| JP | 2003-166445 | 6/2003 |
| JP | 2003-222036 | 8/2003 |

* cited by examiner

EXHAUST GAS RECIRCULATION DEVICE FOR INTERNAL COMBUSTION ENGINE

TECHNICAL FIELD

The present invention relates to an exhaust gas recirculation device for an internal combustion engine.

BACKGROUND ART

In an internal combustion engine such as a diesel engine, exhaust gas recirculation control is an important issue from the viewpoint of cleaning exhaust gas, in particular, cutting emissions of nitrogen oxides. Known exhaust gas recirculation devices are designed to control the opening of an exhaust gas recirculation valve so as to provide a predetermined exhaust gas recirculation ratio as disclosed in, e.g., JP-A-2003-83034, Japanese Patent No. 3329711, and JP-A-2003-516496.

DISCLOSURE OF THE INVENTION

However, the known devices for controlling the opening of the exhaust gas recirculation valve has accompanied the problem that proper control is hard to perform over the entire operating range of the internal combustion engine, particularly with respect to a transient change of operating conditions, when the exhaust gas recirculation ratio has to be abruptly changed to reduce harmful substances contained in the exhaust gas.

An object of the present invention is to provide an exhaust gas recirculation device with an improved response speed and accuracy of exhaust-gas recirculation flow control in an internal combustion engine.

(1) To achieve the above object, the present invention provides an exhaust gas recirculation device for an internal combustion engine, comprising a recirculation gas control valve for controlling a recirculation flow rate in an exhaust gas recirculation passage of the internal combustion engine, and an intake air control valve for controlling a flow rate in an intake passage of the internal combustion engine, the exhaust gas recirculation device further comprising an intake air flow sensor for detecting a flow rate in the intake passage, a recirculation flow sensor for detecting an exhaust-gas recirculation flow rate in the exhaust gas recirculation passage, and control means for performing feedback control of the intake air control valve and/or the recirculation gas control valve so that an exhaust gas recirculation ratio obtained based on outputs of the intake air flow sensor and the recirculation flow sensor is a target recirculation ratio.

With that constitution, it is possible to increase a response speed and accuracy in exhaust-gas recirculation flow control in the internal combustion engine.

(2) In above (1), preferably, when a target value of the recirculation ratio is abruptly changed, the control means performs feedback control of one of the intake air control valve and the recirculation gas control valve which has a faster response.

(3) In above (1), preferably, the exhaust gas recirculation device further comprises a plurality of three-dimensional maps each defined in combination of an opening of the recirculation gas control valve, an opening of the intake air control valve, and the recirculation ratio, wherein the control means selects one of the three-dimensional maps corresponding to an operating state of the internal combustion engine, and controls the intake air control valve and/or the recirculation gas control valve so that the exhaust gas recirculation ratio obtained based on the outputs of the intake air flow sensor and the recirculation flow sensor is the target recirculation ratio.

(4) In above (2), preferably, when the target value of the recirculation ratio is abruptly changed, the control means controls one of the intake air control valve and the recirculation gas control valve which has a faster response.

(5) In above (1), preferably, the exhaust-gas recirculation flow sensor is a sensor for detecting the recirculation flow rate based on a pressure difference between at least two or more points in the exhaust gas recirculation passage, or a sensor for detecting a mass flow rate in the exhaust gas recirculation passage, and the intake air flow sensor is a sensor for detecting the intake air flow rate based on a pressure difference between at least two or more points in the intake passage, or a sensor for detecting a mass flow rate in the intake passage.

(6) In above (1), preferably, the intake air control valve is an electronically controlled type throttle actuator.

BEST MODE FOR CARRYING OUT THE INVENTION

The construction and operation of an exhaust gas recirculation device for an internal combustion engine according to one embodiment of the present invention will be described below with reference to FIGS. 1-8.

First, the construction of an engine system using the exhaust gas recirculation device for the internal combustion engine according to this embodiment will be described with reference to FIG. 1. The following description is made of, by way of example, the construction of a diesel engine.

Figure 1:
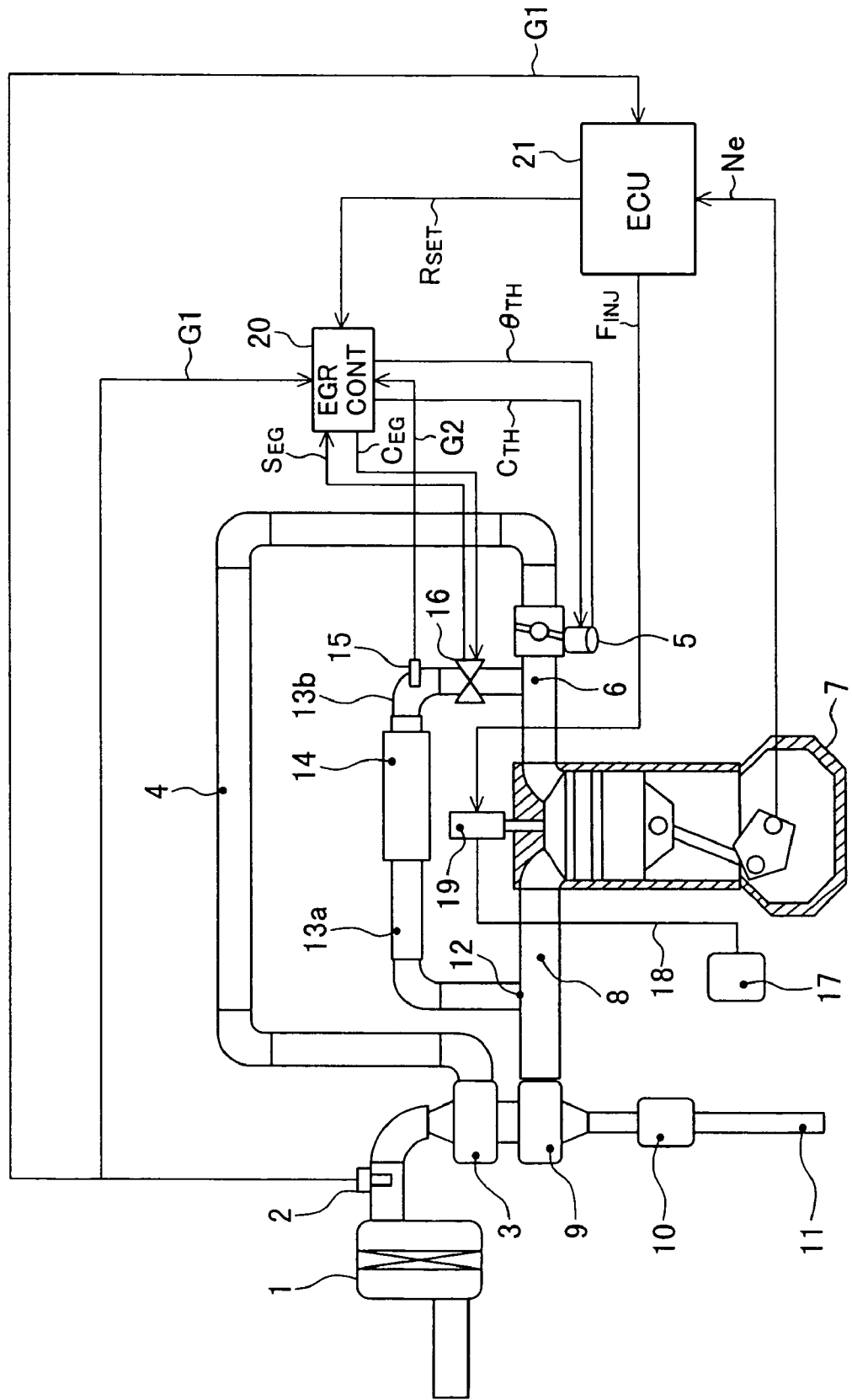
FIG. 1 illustrates the construction of an engine system using an exhaust gas recirculation device for an internal combustion engine according to one embodiment of the present invention.

FIG. 1 illustrates the construction of the engine system using the exhaust gas recirculation device for the internal combustion engine according to one embodiment of the present invention.

Air taken into an engine enters an air cleaner 1 in which dust in the intake air is removed. An intake air flow rate G1 is detected by an intake air flow sensor 2. A signal of the detected intake air flow rate G1 is inputted to an engine control unit (ECU) 21 and an exhaust gas recirculation controller (EGR CONT) 20. The intake air is pressurized by a turbocharger compressor 3, and after passing through an intake pipe 4, the flow rate or pressure of the intake air is controlled by an intake air flow control valve 5. Further, the intake air flows into an intake manifold 6 and is then distributed to respective cylinders of an engine 7.

The opening of the intake air flow control valve 5 is controlled in accordance with an intake air flow control signal $C_{TH}$ outputted from the exhaust gas recirculation controller 20. The intake air flow control valve 5 is in the form of, e.g., a butterfly valve. A signal indicating the opening of the butterfly valve is detected and taken, as an opening signal $\theta_{TH}$, into the exhaust gas recirculation controller 20.

Fuel for combustion is supplied from a fuel injection valve 19 disposed in the engine 7 to a cylinder of the engine 7. The fuel supply to the fuel injection valve 19 is performed by a fuel pump 17 through a fuel pipe 18. Also, the amount of fuel injected from the fuel injection valve 19 is controlled by the ECU 21, and the ECU 21 supplies a fuel injection amount signal $F_{INJ}$ to the fuel injection valve 19.

Gas exhausted after the completion of combustion in the engine 7 is collected into an exhaust manifold 8, and after passing through a turbocharger turbine 9, the exhaust gas is exhausted to the atmosphere through a catalyst 10 and an exhaust pipe 11. The exhaust manifold 8 is provided with a branch portion 12 such that a part of the exhaust gas from the engine 7 is branched. The branched exhaust gas is introduced, as recirculation gas, to a recirculation pipe 13a. A recirculation gas cooler 14 is disposed in the recirculation pipe 13a. The recirculation gas cooled by the recirculation gas cooler 14 is returned to the intake manifold 6 after passing through a recirculation pipe 13b and a recirculation gas control valve 16.

The opening of the recirculation gas control valve 16 is controlled in accordance with an opening control signal $C_{EG}$ outputted from the exhaust gas recirculation controller 20 to the recirculation gas control valve 16. The recirculation gas control valve 16 is in the form of, e.g., a seat valve. The stroke amount of the seat valve is detected and taken, as a stroke signal $ST_{EG}$, into the exhaust gas recirculation controller 20. When a butterfly valve, for example, is used as the recirculation gas control valve 16, a signal indicating the opening of the butterfly valve is taken into the exhaust gas recirculation controller 20.

A recirculation gas flow sensor 15 is disposed in the recirculation pipe 13b and measures a flow rate G2 of the recirculation gas flowing through the recirculation pipe. The measured recirculation gas flow rate G2 is inputted to the exhaust gas recirculation controller 20. Note that the recirculation gas cooler 14 is disposed to lower the temperature of the recirculation gas, but it may be dispensed with.

The ECU 21 receives not only a revolution speed signal $N_E$ of the engine 7 and the intake air flow signal G1 from the intake air flow sensor 2, but also other not-shown signals indicating various states of the engine and a vehicle. The ECU 21 executes arithmetic and logical operations, etc. based on those signals, and sends control command values to various devices. In accordance with the input signals including the revolution speed signal $N_E$ of the engine 7, the intake air flow signal G1 from the intake air flow sensor 2, etc., the ECU 21 determines the operating state of the engine 7. Depending on the determined operating state, ECU 21 outputs a recirculation-gas recirculation ratio command value $R_{SET}$ to the exhaust gas recirculation controller 20.

The exhaust gas recirculation controller 20 computes an exhaust gas recirculation ratio R from the intake air flow rate G1 and the recirculation gas flow rate G2. Then, the exhaust gas recirculation controller 20 performs feedback control of the intake air flow control valve 5 and/or the recirculation gas control valve 16 so that the computed recirculation ratio R is matched with the recirculation-gas recirculation ratio command value $R_{SET}$. In other words, this embodiment is featured in controlling not only the recirculation gas control valve 16, but also the intake air flow control valve 5 so that the recirculation amount of the exhaust gas is a target value.

The control procedures of the exhaust gas recirculation controller in the exhaust gas recirculation device for the internal combustion engine according to this embodiment will be described below with reference to FIGS. 2 and 3.

Figure 2:
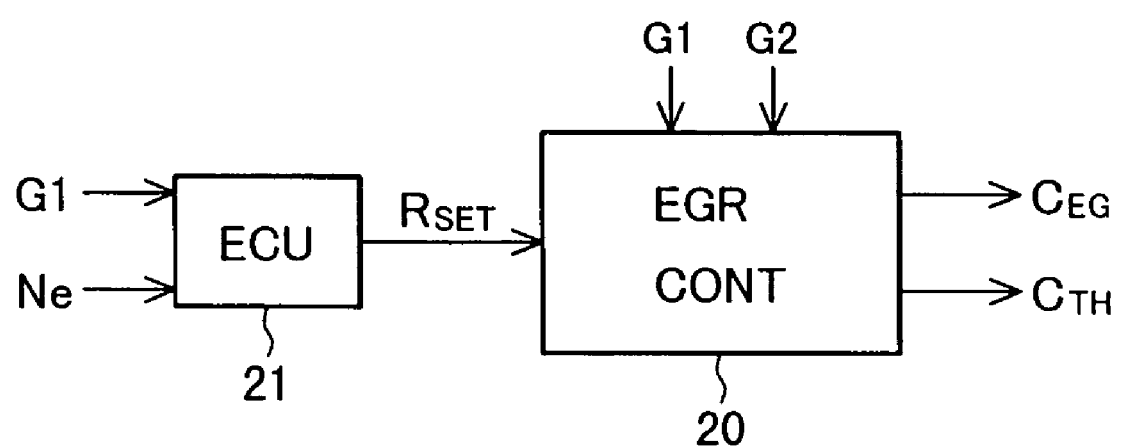
FIG. 2 is a block diagram of a control system in the exhaust gas recirculation device for the internal combustion engine according to one embodiment of the present invention.

FIG. 2 is a block diagram of a control system in the exhaust gas recirculation device for the internal combustion engine according to one embodiment of the present invention. FIG. 3 is a flowchart showing control procedures of the exhaust gas recirculation controller in the exhaust gas recirculation device for the internal combustion engine according to one embodiment of the present invention. The same numerals as those in FIG. 1 denote the same components.

As shown in FIG. 2, the exhaust gas recirculation controller 20 receives the recirculation-gas recirculation ratio command value $R_{SET}$ outputted from the ECU 21, the intake air flow signal G1 detected by the intake air flow sensor 2, and the recirculation gas flow rate G2 detected by the recirculation gas flow sensor 15. The exhaust gas recirculation controller 20 outputs the opening control signal $C_{EG}$ to the recirculation gas control valve 16 and the intake air flow control signal $C_{TH}$ to the intake air flow control valve 5, thereby controlling those valves 16 and 5 so that the exhaust gas recirculation ratio R is matched with the target value $R_{SET}$. Additionally, the exhaust gas recirculation controller 20 computes the exhaust gas recirculation ratio R from the intake air flow signal G1 and the recirculation gas flow rate G2 based on a formula of (G2/(G1+G2)).

In the following description, it is assumed that the intake air flow control valve 5 has a faster response than the recirculation gas control valve 16. More specifically, on condition that the intake air flow control valve 5 is, e.g., a butterfly valve having a bore diameter of 50 φ and the recirculation gas control valve 16 is, e.g., a seat valve having a seat diameter of 30 φ, the response of the intake air flow control valve 5 is faster than that of the recirculation gas control valve 16.

The control procedures of the exhaust gas recirculation controller will be described below with reference to FIG. 3. The following control procedures are all executed by the exhaust gas recirculation controller 20.

Figure 3:
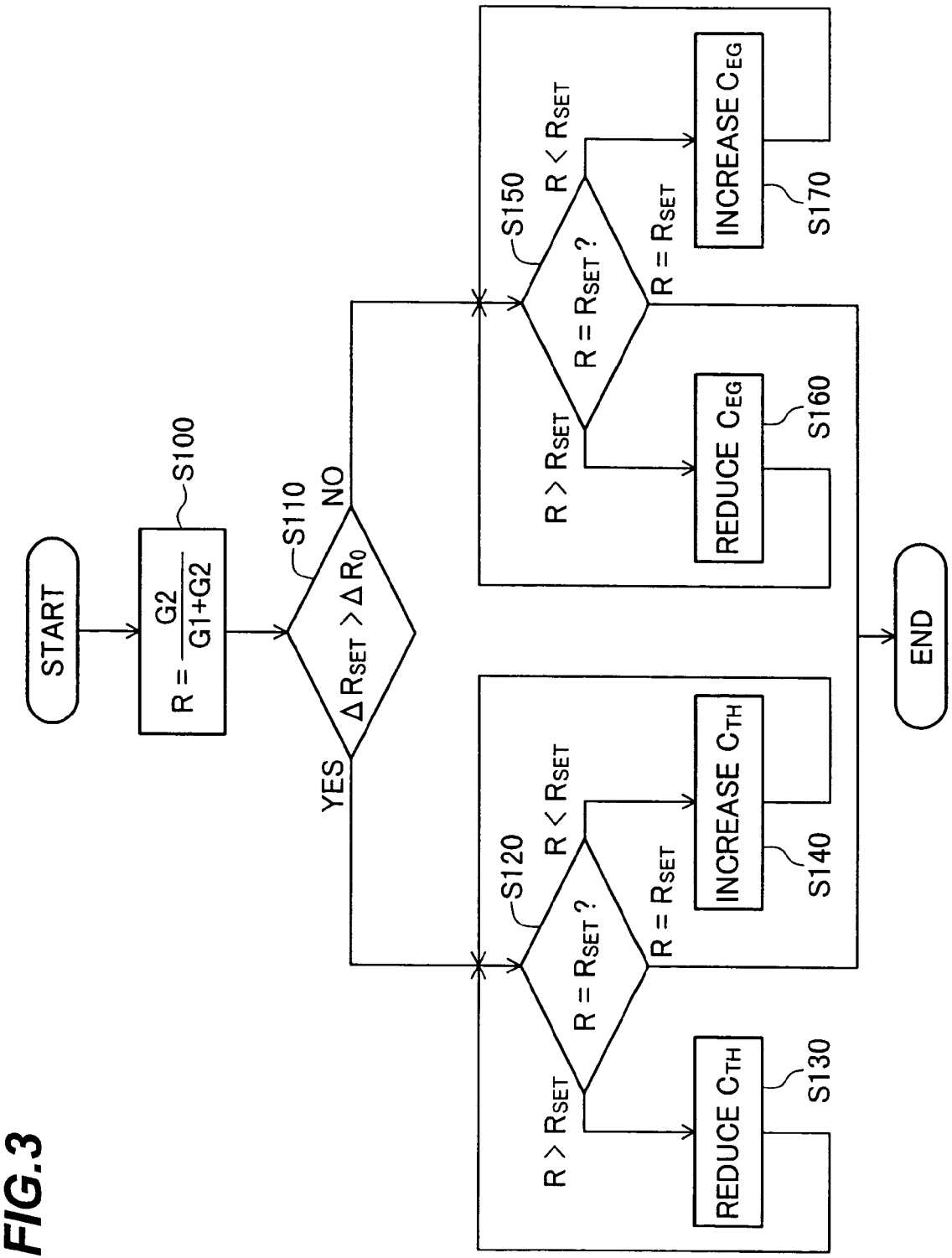
FIG. 3 is a flowchart showing control procedures of an exhaust gas recirculation controller in the exhaust gas recirculation device for the internal combustion engine according to one embodiment of the present invention.

In step s100 of FIG. 3, the exhaust gas recirculation controller 20 computes the exhaust gas recirculation ratio R from the intake air flow signal G1 and the recirculation gas flow rate G2 based on the formula of (G2/(G1+G2)).

Then, in step s110, the exhaust gas recirculation controller 20 determines whether a change $\Delta R_{SET}$ of the target value $R_{SET}$ of the exhaust gas recirculation ratio R inputted from the ECU 21 is larger than a preset reference value $\Delta R_0$. If the change $\Delta R_{SET}$ is larger than the reference value $\Delta R_0$, the control process advances to step s120, and if not so, the control process advances to step s150. Stated another way, in step s110, it is determined whether the target value $R_{SET}$ of the exhaust gas recirculation ratio R has changed to a large extent. Thus, it is determined whether a transient change of operating conditions of the internal combustion engine has occurred and has brought about the necessity of abruptly changing the exhaust gas recirculation ratio to reduce harmful substances contained in the exhaust gas.

If the change $\Delta R_{SET}$ is larger than the reference value $\Delta R_0$, i.e., if the abrupt change of the exhaust gas recirculation ratio is necessitated, it is determined in step s120 whether the exhaust gas recirculation ratio R computed in step s110 is equal to the target value $R_{SET}$ of the exhaust gas recirculation ratio R.

If the recirculation ratio R is larger than the target value $R_{SET}$, the exhaust gas recirculation controller 20 performs, in step s130, control to reduce the opening control signal $C_{TH}$ outputted to the intake air flow control valve 5, thereby reducing the opening of the intake air flow control valve 5. Then, the control process returns to step s120, and the above-described processing is repeated until the recirculation ratio R becomes equal to the target value $R_{SET}$.

On the other hand, if the recirculation ratio R is smaller than the target value $R_{SET}$, the exhaust gas recirculation controller 20 performs, in step s140, control to increase the opening control signal $C_{TH}$ outputted to the intake air flow control valve 5, thereby increasing the opening of the intake air flow control valve 5. Then, the control process returns to step s120, and the above-described processing is repeated until the recirculation ratio R becomes equal to the target value $R_{SET}$.

By repeating the processing of steps s120, s130 and s140 in such a manner, the feedback control is performed until the recirculation ratio R becomes equal to the target value $R_{SET}$. On that occasion, because the response of the intake air flow control valve 5 is faster than that of the recirculation gas control valve 16, the exhaust gas recirculation ratio can be quickly changed to the predetermined target value even in the case of necessitating an abrupt change of the exhaust gas recirculation ratio.

Meanwhile, if the determination in step s110 is that the change $\Delta R_{SET}$ is not larger than the reference value $\Delta R_0$, i.e., if the change of the exhaust gas recirculation ratio is not so large, it is determined in step s150 whether the exhaust gas recirculation ratio R computed in step s110 is equal to the target value $R_{SET}$ of the exhaust gas recirculation ratio R.

If the recirculation ratio R is larger than the target value $R_{SET}$, the exhaust gas recirculation controller 20 performs, in step s160, control to reduce the opening control signal $C_{EG}$ outputted to the recirculation gas control valve 16, thereby reducing the opening of the recirculation gas control valve 16. Then, the control process returns to step s150, and the above-described processing is repeated until the recirculation ratio R becomes equal to the target value $R_{SET}$.

On the other hand, if the recirculation ratio R is smaller than the target value $R_{SET}$, the exhaust gas recirculation controller 20 performs, in step s170, control to increase the opening control signal $C_{EG}$ outputted to the recirculation gas control valve 16, thereby increasing the opening of the recirculation gas control valve 16. Then, the control process returns to step s150, and the above-described processing is repeated until the recirculation ratio R becomes equal to the target value $R_{SET}$.

By repeating the processing of steps s150, s160 and s170 in such a manner, the feedback control is performed until the recirculation ratio R becomes equal to the target value $R_{SET}$. On that occasion, the response of the recirculation gas control valve 16 is slower than that of the intake air flow control valve 5, and finer opening control can be realized. As a result, the exhaust gas recirculation ratio can be precisely changed to the predetermined target value.

While the above description has been made as assuming the response of the intake air flow control valve 5 to be faster than that of the recirculation gas control valve 16, the response of the recirculation gas control valve 16 may be conversely faster than that of the intake air flow control valve 5 in some cases. More specifically, when the intake air flow control valve 5 is, e.g., a butterfly valve having a bore diameter of 30 φ and the recirculation gas control valve 16 is, e.g., a seat valve having a seat diameter of 50 φ, the response of the recirculation gas control valve 16 is faster than that of the intake air flow control valve 5. In such a case, when the abrupt change of the exhaust gas recirculation ratio is necessitated, the recirculation gas control valve 16 having a faster response is controlled, and when the abrupt change is not necessitated, the intake air flow control valve 5 having a lower response is controlled to increase control accuracy.

Thus, even when the abrupt change of the exhaust gas recirculation ratio is necessitated, the control system can be adapted for the abrupt change by controlling the control valve having a faster response. On the other hand, when the abrupt change is not necessitated, the control accuracy can be increased by controlling the control valve having a lower response.

A feedback control method for the exhaust gas recirculation controller in the exhaust gas recirculation device for the internal combustion engine according to this embodiment will be described below with reference to FIG. 4.

Figure 4:
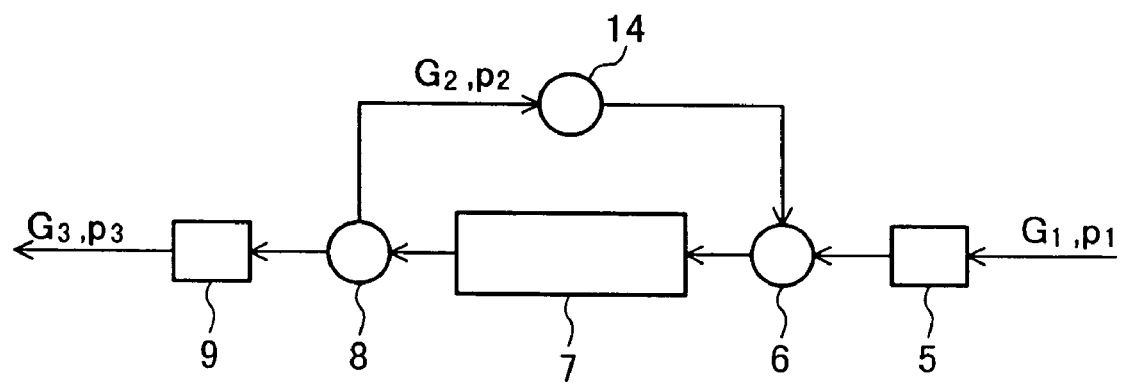
FIG. 4 is a diagram showing, in the modeled form, a system from an intake air flow control valve in the intake side of the engine to a turbocharger turbine in the exhaust side in the exhaust gas recirculation device for the internal combustion engine according to one embodiment of the present invention.

FIG. 4 is a diagram showing, in the modeled form, a system from the intake air flow control valve 5 in the intake side of the engine 7 to the turbocharger turbine 9 in the exhaust side in the exhaust gas recirculation device for the internal combustion engine according to one embodiment of the present invention. The same numerals as those in FIG. 1 denote the same components.

Assuming, as shown in FIG. 4, that the flow rate and pressure of the air passing through the intake air flow control valve 5 are respectively G1 and p1, the flow rate and pressure of the gas passing through the turbocharger turbine 9 are respectively G3 and p3, and the flow rate and pressure of the gas passing through the recirculation pipe 13a in the exhaust side of the engine 7 with respect to the recirculation gas control valve 16 in the engine 7 are respectively G2 and p2, the relationships among those flow rates and pressures in the system are expressed by simultaneous equations of (1), (2) and (3) given below;

$$G1+G2=G3=f3(ne, \eta v, p2) \quad (1)$$

$$G1=f1(p1, p2, \zeta) \quad (2)$$

$$G2=f2(p2, p3, \zeta') \quad (3)$$

wherein ne: engine revolution speed, η: volumetric efficiency of an engine, v: engine displacement, p1: intake pressure, p2: engine back pressure, p3: back pressure of the turbocharger turbine, ζ: loss coefficient of the intake air flow control valve, ζ': loss coefficient of the recirculation gas control valve, f1: flow rate characteristic of the intake air flow control valve, and f2: flow rate characteristic of the recirculation gas control valve.

Meanwhile, the recirculation-gas recirculation ratio R is given by R=G2/(G1+G2) as mentioned above. In other words, the recirculation-gas recirculation ratio R is uniquely decided once the flow rate G1 passing through the intake air flow control valve 5 and the flow rate G2 passing through the recirculation gas control valve 16 are obtained.

As expressed by the equation (2), the flow rate G1 passing through the intake air flow control valve 5 can be controlled based on the loss coefficient ζ, i.e., the valve opening of the intake air flow control valve 5. Similarly, as expressed by the equation (3), the flow rate G2 passing through the recirculation gas control valve 16 can be controlled based on the loss coefficient ζ', i.e., the valve opening of the recirculation gas control valve 16. Stated another way, the recirculation-gas recirculation ratio R can be controlled by incorporating a feedback system based on values of both the flow rates G1 and G2 in a system for commanding the valve opening of the intake air flow control valve 5 and the valve opening of the recirculation gas control valve 16.

In addition, the control speed can be increased by confirming the flow rate characteristic of the intake air flow control valve 5 and the flow rate characteristic of the recirculation gas control valve 16 in advance. More specifically, confirmation is previously made, for example, on a change of the flow rate per unit time resulting when the intake air flow rate is changed by driving the intake air flow control valve 5 and a change of the flow rate per unit time resulting when the intake air flow rate is changed by driving the recirculation gas control valve 16. If the change of the flow rate per unit time resulting when the intake air flow rate is changed by driving the intake air flow control valve 5 is quicker than that of the flow rate per unit time resulting when the intake air flow rate is changed by driving the recirculation gas control valve 16, i.e., if the response of the intake air flow control valve 5 is faster than that of the recirculation gas control valve 16, the exhaust gas recirculation ratio can be quickly changed to the predetermined target value by controlling the intake air flow control valve 5 in the case where the abrupt change of the exhaust gas recirculation ratio is necessitated, thus resulting in a higher control speed.

The constructions of the recirculation gas flow sensor 15 used in the exhaust gas recirculation device for the internal combustion engine according to this embodiment will be described below with reference to FIGS. 5 and 6.

Figure 5:
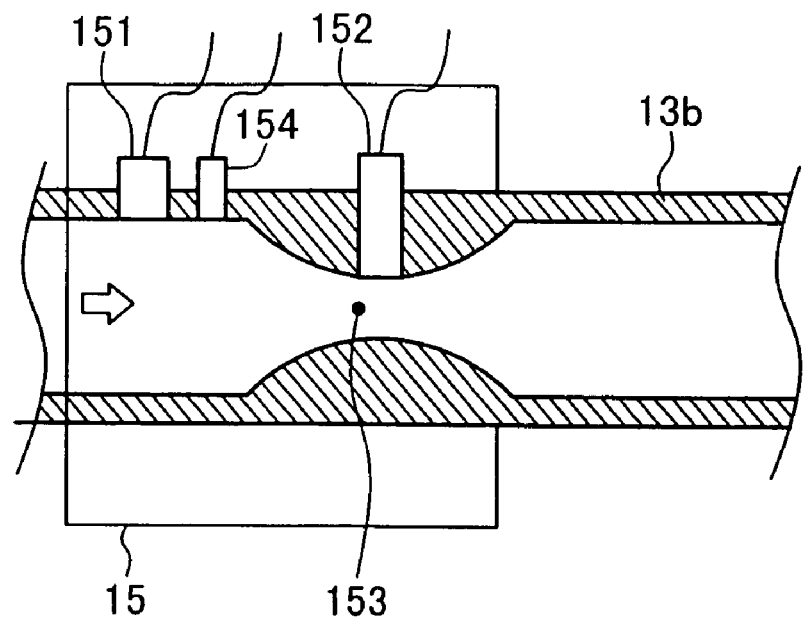
FIG. 5 is a partial sectional view showing a first construction of a recirculation gas flow sensor used in the exhaust gas recirculation device for the internal combustion engine according to one embodiment of the present invention.

FIG. 5 is a partial sectional view showing a first construction of the recirculation gas flow sensor used in the exhaust gas recirculation device for the internal combustion engine according to one embodiment of the present invention. FIG. 6 is a partial sectional view showing a second construction of the recirculation gas flow sensor used in the exhaust gas recirculation device for the internal combustion engine according to one embodiment of the present invention.

The recirculation gas flow sensor 15 shown in FIG. 5 is of the type measuring the recirculation gas flow rate based on the pressure in the recirculation pipe. A throttle portion 153 is formed in a part of the inner wall surface of the recirculation pipe 13b. A lower-pressure side pressure sensor 152 is disposed such that its sensing portion is opened in the throttle portion 153. A higher-pressure side pressure sensor 151 is disposed such that its sensing portion is opened to the recirculation pipe 13b at a position where the throttle portion 153 is not disposed. The lower-pressure side pressure sensor 152 and the higher-pressure side pressure sensor 151 cooperatively measure the pressure inside the recirculation pipe 13b. Because the lower-pressure side pressure sensor 152 is disposed in the throttle portion 153, the measurement can be performed by utilizing the Venturi effect based on the Bernoulli's theory. From the pressure difference between the two pressure sensors 151 and 152, the exhaust gas recirculation controller 20 is able to detect the recirculation gas flow rate G2 in the recirculation pipe 13b. In addition, there is disposed a temperature sensor 154 for detecting the temperature of the recirculation gas flowing through the recirculation pipe 13b. By using the temperature detected by the temperature sensor 154, the exhaust gas recirculation controller 20 modifies the recirculation gas flow rate G2 obtained from the pressure difference between the pressure sensors 151 and 152. Instead, the recirculation gas flow sensor 15 may incorporate therein a circuit device for measuring the recirculation gas flow rate G2 from the pressure difference between the pressure sensors 151 and 152 and for modifying the measured recirculation gas flow rate G2 in accordance with the temperature of the recirculation gas detected by the temperature sensor 154. In this case, the recirculation gas flow sensor 15 outputs a detected signal of the recirculation gas flow rate G2 to the exhaust gas recirculation controller 20.

Figure 6:
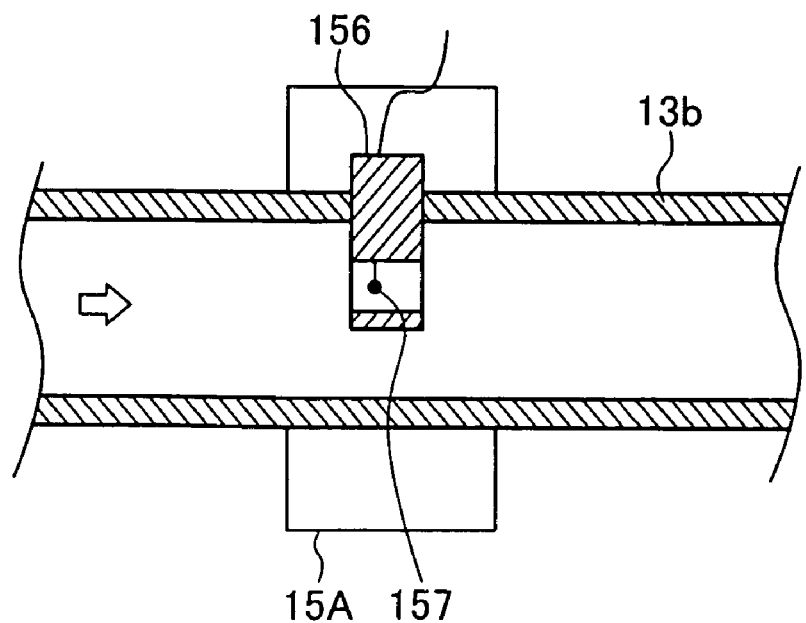
FIG. 6 is a partial sectional view showing a second construction of the recirculation gas flow sensor used in the exhaust gas recirculation device for the internal combustion engine according to one embodiment of the present invention.

A recirculation gas flow sensor 15A shown in FIG. 6 is of the type measuring the recirculation gas flow rate by using a hot-wire sensor. The recirculation gas flow sensor 156 is mounted to a wall surface of the recirculation pipe 13b. A sensing element 157 is included in the recirculation gas flow sensor 156 to measure the recirculation gas flow rate in the recirculation pipe 13b. A current is supplied to the sensing element 157 such that the sensing element 157 is heated to a constant temperature. The amount of heat deprived of the sensing element 157 is changed depending on the flow rate of the recirculation gas. By controlling the temperature of the sensing element 157 to be held constant in that condition, the current flowing through the sensing element 157 provides a signal representing the recirculation gas flow rate. With that construction using the hot-wire sensor, it is possible to directly measure a mass flow rate, i.e., G2.

While the above description is made of the construction of the recirculation gas flow sensor 15, the intake air flow sensor 2 can also be similarly constituted as either the type detecting the pressure shown in FIG. 5 or the type using the hot-wire sensor shown in FIG. 6.

The characteristics of the intake air flow control valve 5 used in the exhaust gas recirculation device for the internal combustion engine according to this embodiment will be described below with reference to FIGS. 7 and 8.

Figure 7:
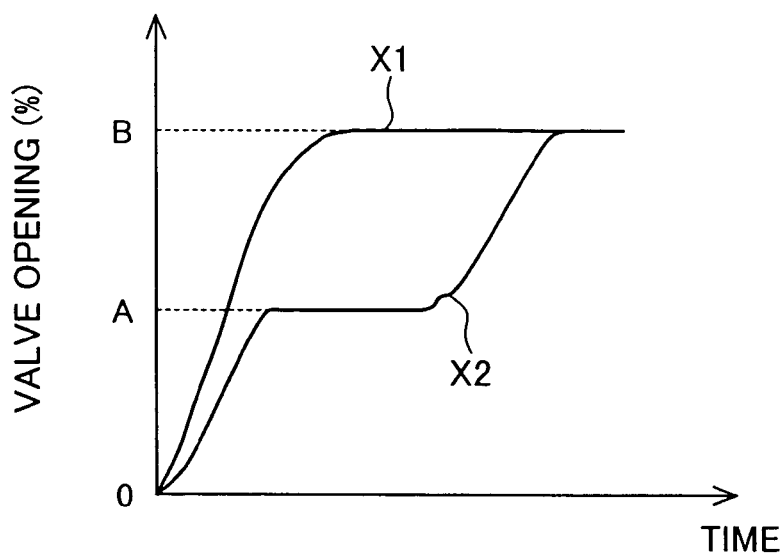
FIG. 7 is a graph showing characteristics of the intake air flow control valve depending on the difference in driving method, which is used in the exhaust gas recirculation device for the internal combustion engine according to one embodiment of the present invention.
Figure 8:
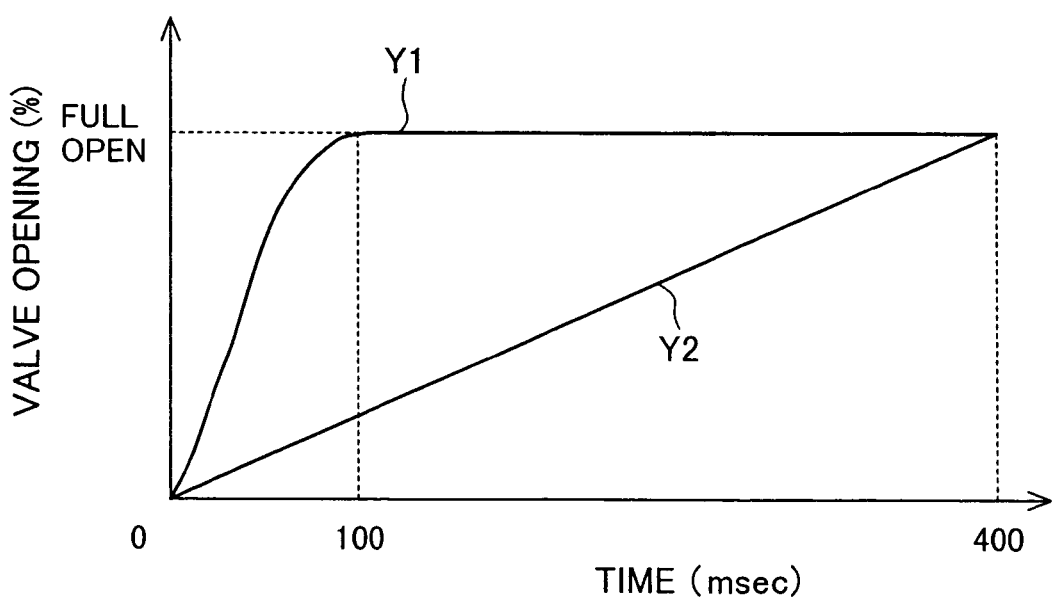
FIG. 8 is a graph showing characteristics of the intake air flow control valve depending on the difference in driving method, which is used in the exhaust gas recirculation device for the internal combustion engine according to one embodiment of the present invention.

FIGS. 7 and 8 are each a graph showing characteristics of the intake air flow control valve depending on the difference in driving method, which is used in the exhaust gas recirculation device for the internal combustion engine according to one embodiment of the present invention. In each of FIGS. 7 and 8, the horizontal axis represents time, and the vertical axis represents the valve opening of the intake air flow control valve. The valve opening represented by the vertical axis is indicated in terms of percentage with a maximum opening degree set to 100%.

In FIG. 7, a solid line X1 represents a characteristic of the valve opening when an electronically controlled type throttle actuator is used as the intake air flow control valve 5. A solid line X2 represents a characteristic of the valve opening when a negative pressure type throttle actuator is used as the intake air flow control valve 5.

The negative pressure type throttle actuator represented by the solid line X2 is able to control the valve opening only at two points, i.e., a valve opening A and a valve opening B corresponding to a fully opened point, and therefore that type actuator is difficult to perform the above-described feedback control for the recirculation ratio of the recirculation gas.

On the other hand, as represented by the solid line X1, when the electronically controlled type throttle actuator is used, the valve opening can be controlled over the range from a valve opening 0 to the fully opened point B in a continuously variable way, and the feedback control can be realized with ease. For that reason, it is preferable to employ the electronically controlled type throttle actuator as the intake air flow control valve 5 used in this embodiment.

Next, FIG. 8 depicts the difference in characteristic depending on the difference in driving method of the electronically controlled type throttle actuator. A solid line Y1 represents response of a throttle actuator in which a throttle valve is driven by a DC motor. A solid line Y2 represents response of a throttle actuator in which a throttle valve is driven by a stepping motor.

The stepping motor is rotated responsive to a driving pulse and is able to perform open loop control, but its response speed is lower than that in the case of using the DC motor as seen from the characteristic represented by the solid line Y2 in FIG. 8. Also, the stepping motor has a difficulty in speeding up response because of limitation that is required, for example, to avoid the motor from being out of synchronism. Therefore, when a higher response speed is demanded, the use of the stepping motor increases the motor size and pushes up the cost.

To the contrary, the DC motor is more easily available as a small-sized and high-rotation motor. Further, by performing feedback control of position, the DC motor can be preferably used a small-sized, high-speed and low-cost driving source.

Also, looking at control resolution, the stepping motor is not adapted for speedup because the control resolution in the stepping motor is given by a driving step. On the other hand, in the DC motor, the control resolution is decided depending on the resolution of a position sensor used in feedback control. By using a continuous output element such as a potentiometer, therefore, a feedback system having a high resolution can be constituted with ease.

Accordingly, the DC motor is more preferable as a driving source of the electronically controlled type throttle actuator. In addition, the use of a brushless motor can also provide similar results to those obtained with the DC motor.

According to this embodiment, as described above, even when the abrupt change of the exhaust gas recirculation ratio is necessitated, the control system can be adapted for the abrupt change by controlling the control valve having a faster response. On the other hand, when the abrupt change is not necessitated, the control accuracy can be increased by controlling the control valve having a lower response.

The construction and operation of an exhaust gas recirculation device for an internal combustion engine according to another embodiment of the present invention will be described below with reference to FIGS. 9-11. Note that the construction of an engine system using the exhaust gas recirculation device for the internal combustion engine according to this embodiment is the same as that shown in FIG. 1.

Figure 9:
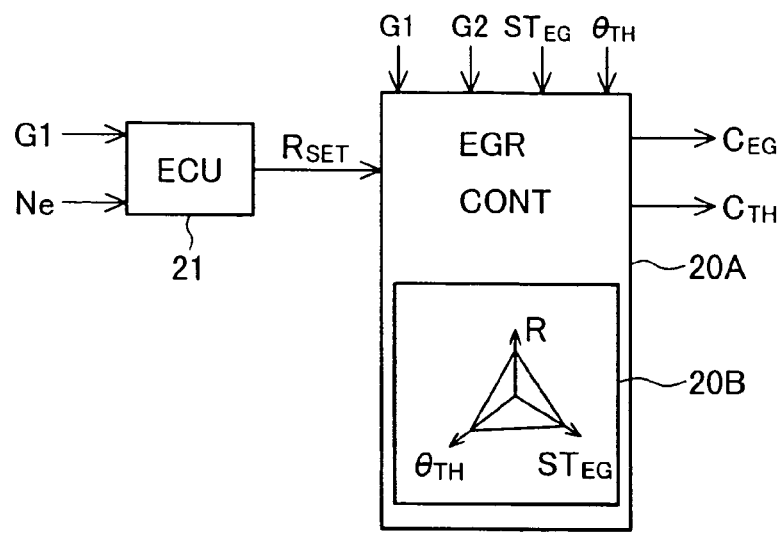
FIG. 9 is a block diagram of a control system in an exhaust gas recirculation device for an internal combustion engine according to another embodiment of the present invention.

FIG. 9 is a block diagram of a control system in the exhaust gas recirculation device for the internal combustion engine according to another embodiment of the present invention. The same numerals as those in FIG. 1 denote the same components. FIG. 10 illustrates a map used in the exhaust gas recirculation device for the internal combustion engine according to another embodiment of the present invention. FIG. 11 is a flowchart showing control procedures of an exhaust gas recirculation controller in the exhaust gas recirculation device for the internal combustion engine according to another embodiment of the present invention. The same numerals as those in FIG. 3 denote the same components.

In this embodiment, as shown in FIG. 9, an exhaust gas recirculation controller 20A includes a three-dimensional map 20B stored therein. The exhaust gas recirculation controller 20A receives the recirculation-gas recirculation ratio command value $R_{SET}$ outputted from the ECU 21, the intake air flow signal G1 detected by the intake air flow sensor 2, the recirculation gas flow signal G2 detected by the recirculation gas flow sensor 15, the opening signal $\theta_{TH}$ from the intake air flow control valve 5, and the stroke signal $ST_{EG}$ from the recirculation gas control valve 16.

The exhaust gas recirculation controller 20A computes the exhaust gas recirculation ratio R from the intake air flow rate G1 and the recirculation gas flow rate G2 based on the formula of (G2/(G1+G2)). In order to make the exhaust gas recirculation ratio R matched with the target value $R_{SET}$, the exhaust gas recirculation controller 20A first outputs the opening control signal $C_{EG}$ to the recirculation gas control valve 16 and the intake air flow control signal $C_{TH}$ to the intake air flow control valve 5 by referring to the map 20B, and then outputs the opening control signal $C_{EG}$ to the recirculation gas control valve 16 and the intake air flow control signal $C_{TH}$ to the intake air flow control valve 5 through the feedback control, thereby controlling those valves 16 and 5.

The details of the three-dimensional map 20B will be described below with reference to FIG. 10. The map 20B is a three-dimensional map representing the relationships among a fresh air passage opening $\theta_{TH}$ (%), a recirculation passage opening $S_{TEG}$ (%), and the recirculation ratio R (%). When the intake air flow control valve 5 is a butterfly valve, the fresh air passage opening $\theta_{TH}$ (%) is given by the opening signal $\theta_{TH}$ indicated in terms of percentage with a maximum opening set to 100%. When the recirculation gas control valve 16 is a seat valve, the recirculation passage opening $S_{TEG}$ (%) is given by the stroke signal $ST_{EG}$ indicated in terms of percentage with a maximum stroke amount of the seat valve set to 100%.

Figure 10:
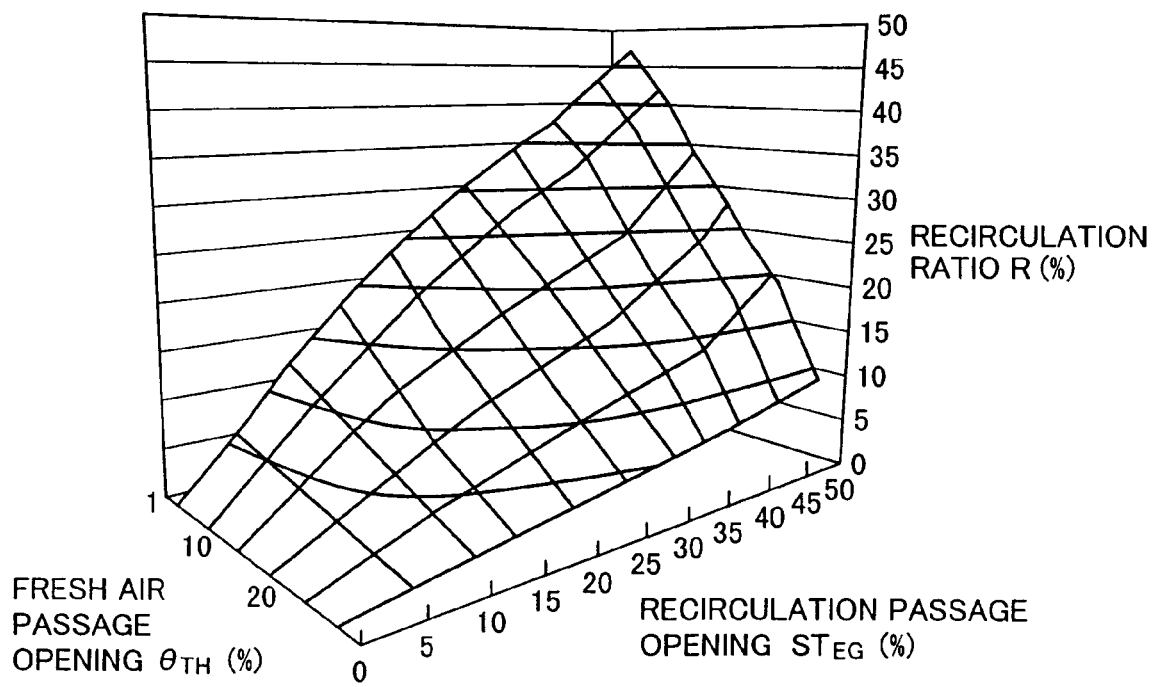
FIG. 10 illustrates a map used in the exhaust gas recirculation device for the internal combustion engine according to another embodiment of the present invention.

FIG. 10 shows the result obtained by solving the above-mentioned equations (1), (2) and (3) in a certain engine operating state. For the sake of illustration, in FIG. 10, the plotted opening range of the intake air flow control valve 5 is from 5% to 25%, and the plotted opening range of the recirculation gas control valve 16 is from 0% to 60%. Each lattice point on the three-dimensional map represents the relationship between the valve opening of the intake air flow control valve 5 and the valve opening of the recirculation gas control valve, which satisfies each value of the recirculation-gas recirculation ratio. The three-dimensional map 20B is prepared in plural corresponding to respective engine operating states. By employing the map corresponding to the engine operating state and selecting proper lattice points on that map, it is possible to control the recirculation-gas recirculation ratio with open loop control.

Looking now at a change of the gas recirculation ratio with respect to valve opening changes of the intake air flow control valve 5 and the recirculation gas control valve 16 shown in FIG. 10, a change rate of the gas recirculation ratio with respect to the valve opening change of the intake air flow control valve 5 is larger than that of the gas recirculation ratio with respect to the valve opening change of the recirculation gas control valve 16. Further, in practice, the electronically controlled type throttle actuator is commercially available as a valve operating from the valve opening 0% to 100% in a time of 100 msec or less, and it is able to operate over the range of 5% to 25% in FIG. 10 in about 20 msec. Thus, in the example shown in FIG. 10, the response of the intake air flow control valve 5 is faster than that of the recirculation gas control valve 16. Even when the recirculation-gas recirculation ratio command value $R_{SET}$ is abruptly changed in a pulse-like manner, for example, such a pulse-like variation of the command value can also be coped with by mainly operating the intake air flow control valve 5 that is constituted as the electronically controlled type throttle actuator. In other words, the control system can be adapted for the transient change of the engine operating state as well.

The control procedures of the exhaust gas recirculation controller 20B will be described below with reference to FIG. 11. The following control procedures are all executed by the exhaust gas recirculation controller 20B. The same step numbers as those in FIG. 3 denote the same processing procedures. In this embodiment, processing of steps s210-s240 is added to the processing shown in FIG. 3.

Figure 11:
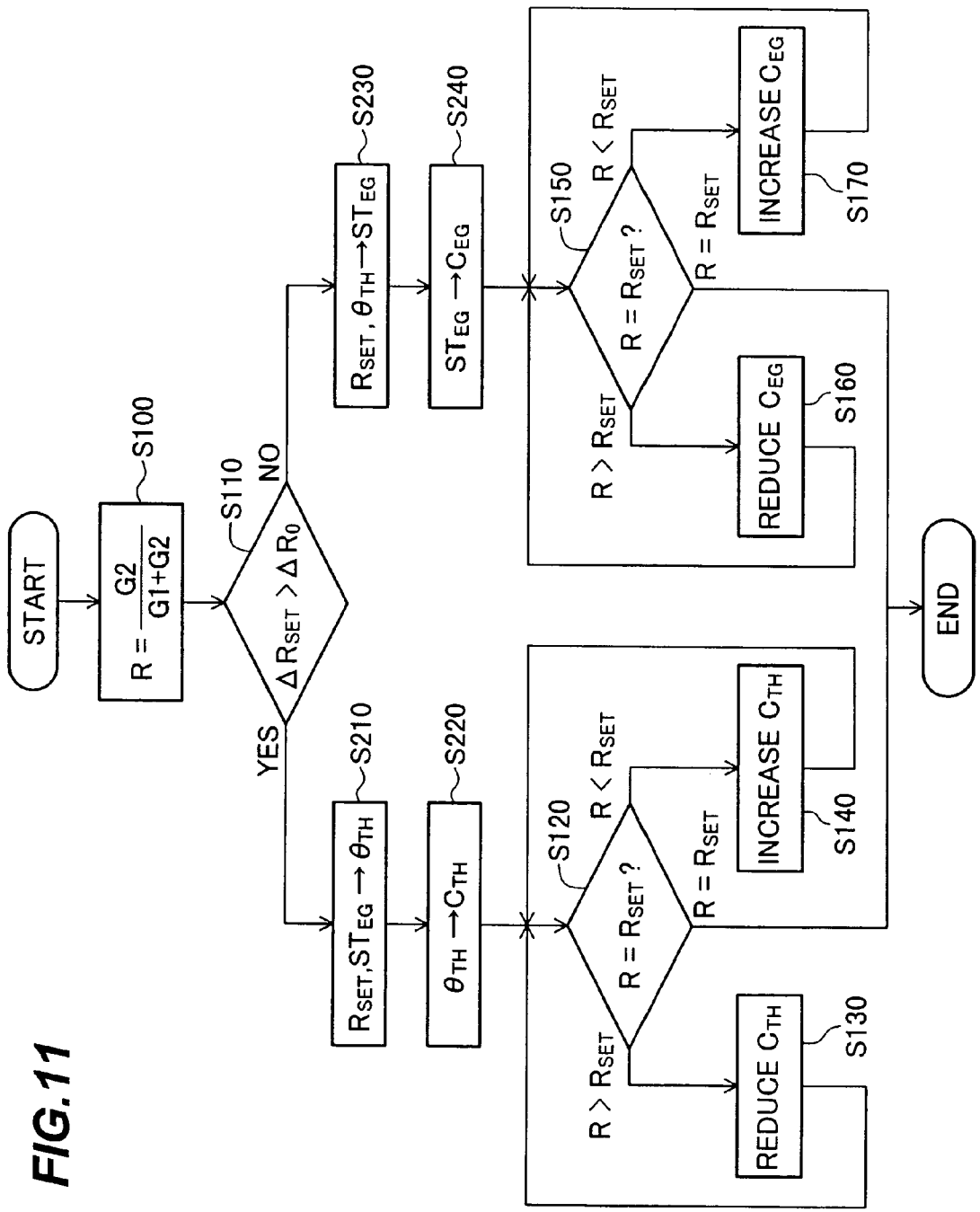
FIG. 11 is a flowchart showing control procedures of an exhaust gas recirculation controller in the exhaust gas recirculation device for the internal combustion engine according to another embodiment of the present invention.

In step s100 of FIG. 11, the exhaust gas recirculation controller 20B computes the exhaust gas recirculation ratio R from the intake air flow signal G1 and the recirculation gas flow rate G2 based on the formula of (G2/(G1+G2)).

Then, in step s110, the exhaust gas recirculation controller 20B determines whether a change $\Delta R_{SET}$ of the target value $R_{SET}$ of the exhaust gas recirculation ratio R inputted from the ECU 21 is larger than a preset reference value $\Delta R_0$. If the change $\Delta R_{SET}$ is larger than the reference value $\Delta R_0$, the control process advances to step s210, and if not so, the control process advances to step s230. Stated another way, in step s110, it is determined whether the target value $R_{SET}$ of the exhaust gas recirculation ratio R has changed to a large extent. Thus, it is determined whether a transient change of operating conditions of the internal combustion engine has occurred and has brought about the necessity of abruptly changing the exhaust gas recirculation ratio to reduce harmful substances contained in the exhaust gas.

If the change $\Delta R_{SET}$ is larger than the reference value $\Delta R_0$, i.e., if the abrupt change of the exhaust gas recirculation ratio is necessitated, the exhaust gas recirculation controller 20A computes, in step s210, a target fresh air passage opening $\theta_{TH}$ (%) from both the recirculation ratio R and the recirculation passage opening $S_{TEG}$ (%), which correspond to the recirculation-gas recirculation ratio command value $R_{SET}$, by using the three-dimensional map 20B corresponding to the engine operating state at that time.

Then, open loop control is performed in step s220 to output, to the intake air flow control valve 5, the opening control signal $C_{TH}$ for providing the target fresh air passage opening $\theta_{TH}$ (%) so that the opening of the intake air flow control valve 5 is matched with the fresh air passage opening $\theta_{TH}$ (%). In other words, the opening of the intake air flow control valve 5 can be quickly controlled to a value near the target fresh air passage opening $\theta_{TH}$ (%) by controlling the opening of the intake air flow control valve 5 to be matched with the target fresh air passage opening $\theta_{TH}$ (%) in an open loop way.

Then, it is determined in step s120 whether the exhaust gas recirculation ratio R computed in step s110 is equal to the target value $R_{SET}$ of the exhaust gas recirculation ratio R.

If the recirculation ratio R is larger than the target value $R_{SET}$, the exhaust gas recirculation controller 20A performs, in step s130, control to reduce the opening control signal $C_{TH}$ outputted to the intake air flow control valve 5, thereby reducing the opening of the intake air flow control valve 5. Then, the control process returns to step s120, and the above-described processing is repeated until the recirculation ratio R becomes equal to the target value $R_{SET}$.

On the other hand, if the recirculation ratio R is smaller than the target value $R_{SET}$, the exhaust gas recirculation controller 20A performs, in step s140, control to increase the opening control signal $C_{TH}$ outputted to the intake air flow control valve 5, thereby increasing the opening of the intake air flow control valve 5. Then, the control process returns to step s120, and the above-described processing is repeated until the recirculation ratio R becomes equal to the target value $R_{SET}$.

By repeating the processing of steps s120, s130 and s140 in such a manner, the feedback control is performed until the recirculation ratio R becomes equal to the target value $R_{SET}$. Because the response of the intake air flow control valve 5 is faster than that of the recirculation gas control valve 16 as described above, the exhaust gas recirculation ratio can be quickly changed to the predetermined target value even in the case of necessitating an abrupt change of the exhaust gas recirculation ratio.

Meanwhile, if the determination in step s110 is that the change $\Delta R_{SET}$ is not larger than the reference value $\Delta R_0$, i.e., if the change of the exhaust gas recirculation ratio is not so large, the exhaust gas recirculation controller 20A computes, in step s230, a target recirculation passage opening $ST_{EG}$ (%) from both the recirculation ratio R and the fresh air passage opening $\theta_{TH}$ (%), which correspond to the recirculation-gas recirculation ratio command value $R_{SET}$, by using the three-dimensional map 20B corresponding to the engine operating state at that time.

Then, open loop control is performed in step s240 to output, to the recirculation gas control valve 16, the opening control signal $C_{EG}$ for providing the target recirculation passage opening $ST_{EG}$ (%) so that the opening of the recirculation gas control valve 16 is matched with the recirculation passage opening $ST_{EG}$ (%).

Then, it is determined in step s150 whether the exhaust gas recirculation ratio R computed in step s110 is equal to the target value $R_{SET}$ of the exhaust gas recirculation ratio R.

If the recirculation ratio R is larger than the target value $R_{SET}$, the exhaust gas recirculation controller 20A performs, in step s160, control to reduce the opening control signal $C_{EG}$ outputted to the recirculation gas control valve 16, thereby reducing the opening of the recirculation gas control valve 16. Then, the control process returns to step s150, and the above-described processing is repeated until the recirculation ratio R becomes equal to the target value $R_{SET}$.

On the other hand, if the recirculation ratio R is smaller than the target value $R_{SET}$, the exhaust gas recirculation controller 20A performs, in step s170, control to increase the opening control signal $C_{EG}$ outputted to the recirculation gas control valve 16, thereby increasing the opening of the recirculation gas control valve 16. Then, the control process returns to step s150, and the above-described processing is repeated until the recirculation ratio R becomes equal to the target value $R_{SET}$.

By repeating the processing of steps s150, s160 and s170 in such a manner, the feedback control is performed until the recirculation ratio R becomes equal to the target value $R_{SET}$. On that occasion, the response of the recirculation gas control valve 16 is slower than that of the intake air flow control valve 5, and finer opening control can be realized. As a result, the exhaust gas recirculation ratio can be precisely changed to the predetermined target value.

While the above description has been made as assuming the response of the intake air flow control valve 5 to be faster than that of the recirculation gas control valve 16, the response of the recirculation gas control valve 16 may be conversely faster than that of the intake air flow control valve 5 in some cases. In such a case, when the abrupt change of the exhaust gas recirculation ratio is necessitated, the recirculation gas control valve 16 having a faster response is first controlled in an open loop way, and is then subjected to feedback control. When the abrupt change is not necessitated, the intake air flow control valve 5 having a lower response is controlled to increase control accuracy.

According to this embodiment, as described above, even when the abrupt change of the exhaust gas recirculation ratio is necessitated, the control system can be adapted for the abrupt change by first controlling the control valve having a faster response in an open loop way, thus quickly moving the valve so as to have an opening near the target opening, and then performing feedback control so that the valve opening is converged to the target opening. On the other hand, when the abrupt change is not necessitated, the control accuracy can be increased by controlling the control valve having a lower response.

INDUSTRIAL APPLICABILITY

According to the present invention, it is possible to increase the response speed and accuracy in the exhaust-gas recirculation flow control in the internal combustion engine.

The invention claimed is:

1. An exhaust gas recirculation device for an internal combustion engine, comprising a recirculation gas control valve for controlling a recirculation flow rate in an exhaust gas recirculation passage of said internal combustion engine, and an intake air control valve for controlling a flow rate in an intake passage of said internal combustion engine, said exhaust gas recirculation device further comprising:

an intake air flow sensor for detecting a flow rate in said intake passage, a recirculation flow sensor for detecting an exhaust-gas recirculation flow rate in said exhaust gas recirculation passage, and control means for performing feedback control of said intake air control valve and/or said recirculation gas control valve so that an exhaust gas recirculation ratio obtained based on outputs of said intake air flow sensor and said recirculation flow sensor is a target recirculation ratio.

2. The exhaust gas recirculation device for the internal combustion engine according to claim 1, further comprising a plurality of three-dimensional map each defined in combination of an opening of the recirculation gas control valve, an opening of said intake air control valve, and the recirculation ratio, wherein said control means selects one of said three-dimensional maps corresponding to an operating state of said internal combustion engine, and controls said intake air control valve and/or said recirculation gas control valve so that the exhaust gas recirculation ratio obtained based on the outputs of said intake air flow sensor and said recirculation flow sensor is the target recirculation ratio.

3. The exhaust gas recirculation device for the internal combustion engine according to claim 1, wherein said exhaust-gas recirculation flow sensor is a sensor for detecting the recirculation flow rate based on a pressure difference between at least two or more points in said exhaust gas recirculation passage, or a sensor for detecting a mass flow rate in said exhaust gas recirculation passage, and said intake air flow sensor is a sensor for detecting the intake air flow rate based on a pressure difference between at least two or more points in said intake passage, or a sensor for detecting a mass flow rate in said intake passage.

4. The exhaust gas recirculation device for the internal combustion engine according to claim 1, wherein said intake air control valve is an electronically controlled type throttle actuator.

5. The exhaust gas recirculation device for the internal combustion engine according to claim 1, wherein when a target value of the recirculation ratio is abruptly changed, said control means performs feedback control of one of said intake air control valve and said recirculation gas control valve which has a faster response.

6. The exhaust gas recirculation device for the internal combustion engine according to claim 5, wherein when the target value of the recirculation ratio is abruptly changed, said control means controls one of said intake air control valve and said recirculation gas control valve which has a faster response.

* * * * *